March 23, 1971  E. B. DOVE  3,572,153
FLEXIBLE MECHANICAL TRANSMISSION CABLES
Filed July 17, 1969  2 Sheets-Sheet 1

United States Patent Office 3,572,153
Patented Mar. 23, 1971

---

3,572,153
FLEXIBLE MECHANICAL TRANSMISSION CABLES
Ernest Baker Dove, Basildon, Essex, England, assignor to Teleflex Products Limited, Basildon, Essex, England
Filed July 17, 1969, Ser. No. 842,492
Claims priority, application Great Britain, Aug. 9, 1968, 38,134/68
Int. Cl. F16h *1/04;* B21d *53/28*
U.S. Cl. 74—422     3 Claims

ABSTRACT OF THE DISCLOSURE

In a flexible mechanical transmission cable of the type having a multi-wire core and a drive wire applied in an open helix around the core, the cross-section of the drive wire, which has hitherto been circular, is now made of near involute form. The base of this near involute cross-section, which is contiguous with the cable core, is formed with a concavity or convexity such as to cause one or more portions of said base to bed into the core and thereby enhance the grip between the drive wire and the core under load.

---

This invention relates to flexible transmission cables which transmit mechanical effort by longitudinal movement within a surrounding cable conduit.

A well known type of such cable has a core comprising a longitudinal king wire around which layer of wires at various pitches are deposited by close helical winding. Then around this multi-wire core a final drive wire is laid in an open helix at a pitch such that the turns of the drive wire will mesh with the toothed periphery of a drive wheel in a cable operating device, whereby the cable can be translated endwise in its conduit by angular movement of the drive wheel. It is an object of the invention to improve cables of this kind so that they are more efficient.

According to the present invention, whereas the drive wire around the cable core has hitherto been of circular cross section, it is now made of a near involute form. And the base of the wire section, which engages the cable core, is preferably so formed that a portion or portions of it bed into the cable core surface to give enhanced grip. This has advantages both in applications where the cable is wrapped through a considerable angle around a drive wheel and in straight lead applications when it is used like a rack.

Figure 1:
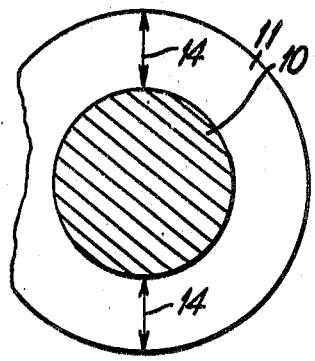
Figure 2:
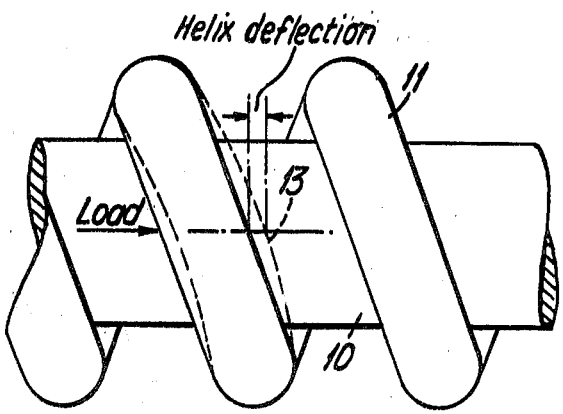
Figure 3:
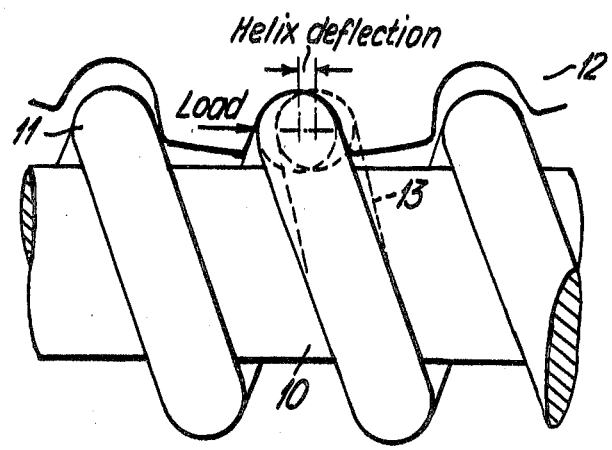
Figure 4:
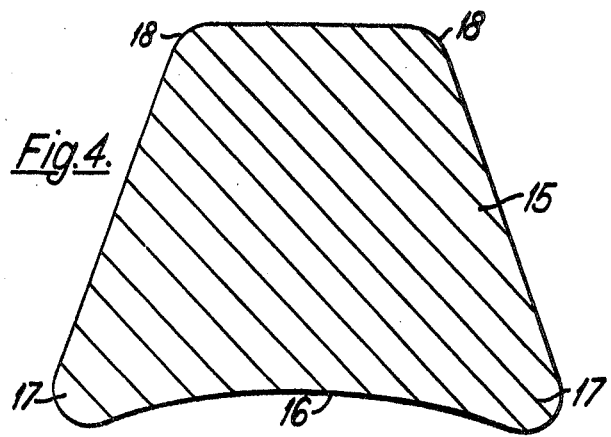
Figure 5:
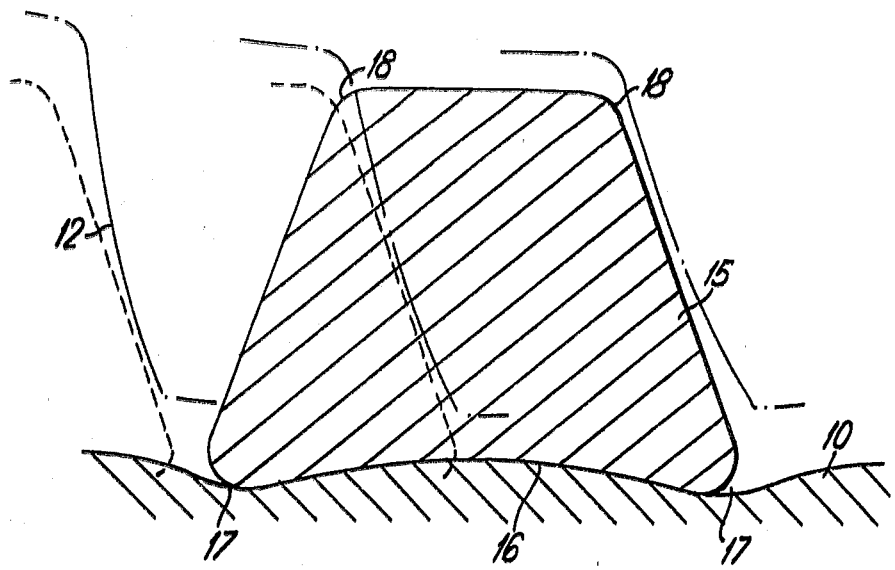
Figure 6:
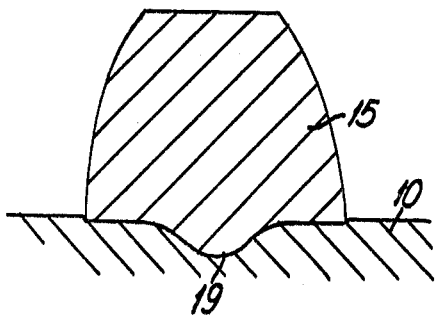

The nature of the invention will now be explained in more detail with reference to the accompanying drawings, in which:

FIGS. 1 and 2 show diagrammatically a conventional prior art cable in cross section and longitudinal elevation, respectively, FIG. 3 illustrates the cable of FIGS. 1 and 2 in operation, FIG. 4 shows, in cross section, an example of a drive wire of a cable according to the invention, FIG. 5 illustrates the cable drive wire of FIG. 4 in operation, and FIG. 6 shows an alternative drive wire cross section.

FIGS. 1, 2 and 3 show a conventional cable 10 with a drive wire 11 of circular cross section. When the driving effort is applied to a straight lead cable by a toothed drive wheel 12 the load is mainly on one turn of the drive wire at a time and tends to deflect the drive wire turn in relation to the cable core as indicated at 13. This sets up a high bending moment in the drive wire turn at points approximately 90° either side of the point of load application, as indicated at 14; and the bending moment is reversed each time the load and the direction of cable movement is reversed, thus causing fatigue.

By employing a drive wire 15 of more nearly involute form, as shown in FIG. 4, with a concave underface 16, higher loads can be taken without the drive wire yielding. This is due, firstly, to the better pressure angle, and secondly, to the improved grip of the underface on the cable core since the well spread bottom corners 17 of the drive wire section become bedded in the core surface during winding. Both these aspects are well illustrated in FIG. 5.

The cross section of the improved drive wire 15 illustrated in FIGS. 4 and 5 is substantially trapezoidal, but with the concave underface 16 already mentioned and radiused corners 17, 18. It is of high tensile steel as in the case of the circular wires employed hitherto.

In wrapped applications, where the cable is led around the drive wheel through an angle of up to 180°, the cable is more efficient, especially at high loads, due to the flat crown of the drive wire section and the better rolling action on and off the drive wheel teeth.

Other drive wire configurations are possible without departing from the scope of the invention. FIG. 6 shows an alternative cross section for the drive wire 15. In this instance, the underface of the drive wire is not concave but has a bulge or convexity 19 at its middle portion which beds into the cable core surface to give grip.

I claim:

1. A flexible mechanical transmission, comprising a multi-wire core built up from a longitudinal tensile king wire around which layers of wires at various pitches are deposited by close helical winding, and a final drive wire laid around said multi-wire core in an open helix, characterized in that the cross section of the drive wire is of near involute form and the base of the new involute drive wire cross section that engages the core is so formed that at least a portion of it beds into said closely wound wires of said multi-wire core to give enhanced grip.

2. A cable according to claim 1, wherein the base of the drive wire cross section is concave.

3. A cable according to claim 1, wherein the base of the drive wire cross section has a bulge.

References Cited

UNITED STATES PATENTS

| | | | |
|---|---|---|---|
| 1,181,971 | 5/1916 | Lovell | 74—458 |
| 3,186,082 | 6/1965 | Ulrich, Jr. et al. | 29—159.2(X) |
| 3,487,709 | 6/1970 | Zieber, Jr. | 74—422 |

LEONARD H. GERIN, Primary Examiner

U.S. Cl. X.R.
29—159.2; 74—458

PO-1050
(5/69)

UNITED STATES PATENT OFFICE
CERTIFICATE OF CORRECTION

Patent No. 3,572,153      Dated March 23, 1971

Inventor(s) ERNEST BAKER DOVE

It is certified that error appears in the above-identified patent and that said Letters Patent are hereby corrected as shown below:

Column 2, line 37, after "transmission" insert -- cable --

Signed and sealed this 19th day of October 1971.

(SEAL)
Attest:

EDWARD M. FLETCHER, JR.      ROBERT GOTTSCHALK
Attesting Officer      Acting Commissioner of Patent